Aug. 9, 1960 J. N. DUPREE 2,948,074
ILLUMINATED PLASTIC PANEL AND METHOD
OF FABRICATING SAME
Filed July 25, 1956 3 Sheets-Sheet 1

INVENTOR.
James N. Dupree
BY Smyth & Poston.
Attorneys

Aug. 9, 1960 J. N. DUPREE 2,948,074
ILLUMINATED PLASTIC PANEL AND METHOD
OF FABRICATING SAME
Filed July 25, 1956 3 Sheets-Sheet 2

INVENTOR.
James N. Dupree
BY
Smyth & Roston
Attorneys

Aug. 9, 1960 J. N. DUPREE 2,948,074
ILLUMINATED PLASTIC PANEL AND METHOD
OF FABRICATING SAME
Filed July 25, 1956 3 Sheets-Sheet 3
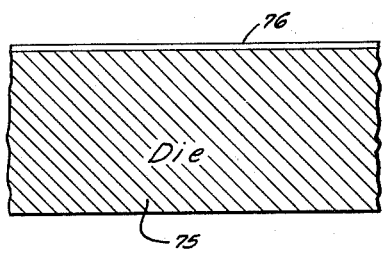
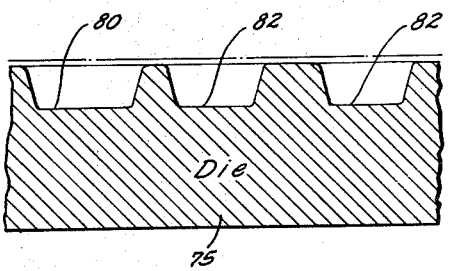
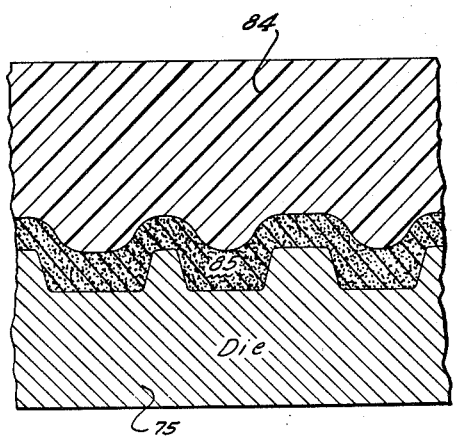
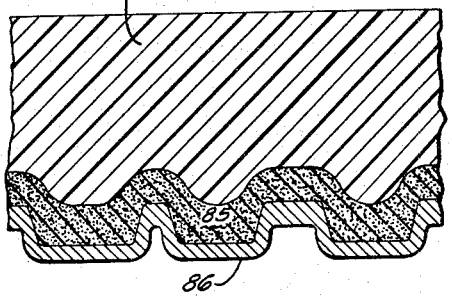
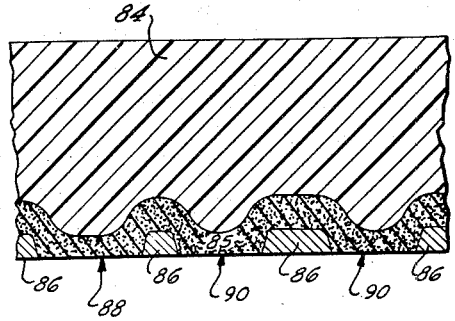
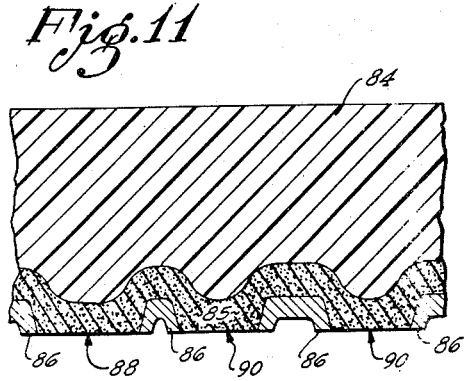
INVENTOR.
James N. Dupree
BY
Smyth & Roston
Attorneys United States Patent Office 2,948,074
Patented Aug. 9, 1960

2,948,074

ILLUMINATED PLASTIC PANEL AND METHOD OF FABRICATING SAME

James N. Dupree, Hollywood, Calif., assignor, by mesne assignments, to California Plasteck, Inc., Los Angeles, Calif., a corporation of California Filed July 25, 1956, Ser. No. 600,110

6 Claims. (Cl. 41—22)

This invention relates to control panels of the type commonly used in aircraft for the observation of designs thereon both by reflected light and by transmitted light and refers particularly to a panel of this type having a design thereon representing a control system.

A panel of the type to which the invention pertains is of laminated construction and includes a relatively thick transparent inner layer, an intermediate translucent layer, and an outer opaque layer, portions of the outer opaque layer being removed to provide a design formed by exposed portions of the intermediate translucent layer. The relatively thick transparent layer permits the panel to be illuminated by light through the panel from the opposite side of the panel or by light directed edgewise into the material of the panel and for this purpose the panel is provided with a number of bores to house suitable lamps in the plane of the panel. The translucent layer is of a color or shade for contrast with the opaque layer to make the design clearly visible by reflected light. Thus, the translucent layer may be white and the outer opaque layer my be black or gray. In a dark environment that does not permit observation of the design by reflected light, the transillumination of the panel by the concealed lamps in the panel bores makes the exposed design portions of the translucent layer clearly visible.

A typical control diagram depicted by the design on such a panel consists of both relatively narrow lines and relatively wide lines. If the diagram represents a fuel system, for example, relatively broad lines are employed to represent the fuel lines and relatively narrow lines are employed for lettering and other indicia. No difficulty arises with respect to the relatively narrow lines, but the use of relatively wide lines formed by removing the opaque outer layer to expose wide bands of the intermediate translucent layer releases too much of the transmitted light and increases the light flux density of areas to an intolerable degree.

The present invention solves this problem by exposing only minute closely spaced portions of the translucent layer instead of a continuous strip to represent the wider lines of a panel design. Thus each pipe line of a fuel system depicted by the panel is represented by a band of such minute areas, the width of the band including several of the minute areas. The result is what may be termed a halftone effect, since a halftone in printing comprises numerous black dots as distinguished from a solid black area. It has been found that such halftone lines on an illuminated panel are adequately visible both by reflected light and by transmitted light without the transmitted light being too intense. Relatively wide lines and areas of the panel may be represented by such closely spaced minute areas with the local flux density subdued to a thoroughly satisfactory degree.

One of the important features of the invention is that the halftone pattern may be varied to make lines of the pattern distinct from each other. Thus one portion of the fuel system having a particular function may be distinguished from other portions of the fuel system by forming gaps in the halftone lines to give the effect of a dotted line. Other portions of the pipe system having other functions may be distinguished by adding spaced narrow lines to the halftone pattern. If desired, the shape of the minute areas may be varied for the same purpose.

Panels of this type may be produced by various methods. A method that is commonly used includes embossing of the plastic material with the application of heat and pressure. The embossing operation requires a metal die which is expensive inasmuch as the die is formed by handwork and requires a great deal of care and skill. In this regard a feature of the present invention is the concept of forming such a die by a photoengraving technique that eliminates the expensive hand labor. The new technique also makes it possible to produce a multiple panel die at nearly nearly the same cost as a single panel die, the multiple panel die being used to emboss a number of panels in one operation.

A further feature of the preferred practice of the invention is the additional reduction in labor costs by the use of commercially available sheets of halftone material to make a layout of a panel design. The sheets of halftone material are coated with a pressure-sensitive adhesive so tha tit is a simple matter to bond portions of the halftone material to a layout sheet to form relatively wide halftone lines of a panel design.

The features and advantages of the invention may be understood by reference to the following detailed description, considered with the accompanying drawings.

In the drawings, which are to be regarded as merely illustrative:

Figure 6 is a greatly enlarged cross section of a metal plate coated with a light-sensitive emulsion for the purpose of producing a die by etching in accord with the teaching of the invention;

Figure 7 is a similar view of the metal plate at the completion of the etching operation;

Figure 8 is a fragmentary sectional view showing how the plastic material of the panel is embossed by means of the die;

Figure 9 is a fragmentary cross section of the embossed plastic material with an added opaque plastic coating;

Figure 10 shows the plastic structure of Figure 9 shaved away to produce the finished panel; and Figure 11 is a view similar to Figure 10 showing the result of shaving away the material of the plastic structure to lesser depth.

Figure 1:
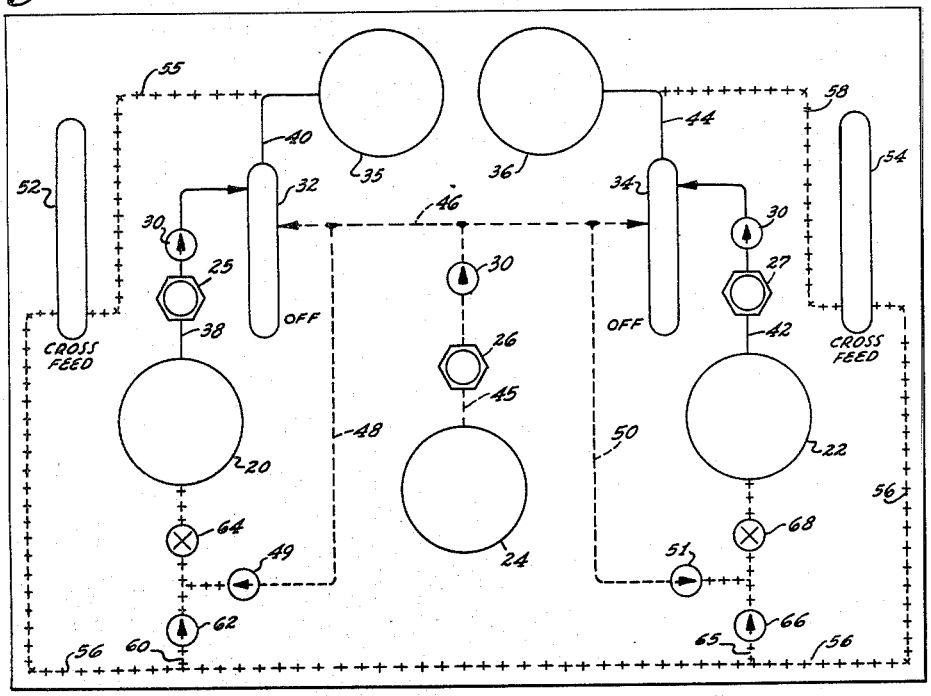
Figure 1 is a diagram of a fuel system of an aircraft that is to be shown schematically on a panel of this type for observation either by transmitted light in an illuminated environment or by transmitted light in a darkened environment.

Figure 1 shows, by way of example, a diagram of a fuel system of an aircraft, which diagram is to be reproduced on a panel at the instrument board of the aircraft for the guidance of the operator in adjustments of the fuel system, the control components of the fuel system being mounted on the same panel as components of the diagram itself. The circle 20 represents the number one main fuel tank, the circle 22 represents the number two main fuel tank, and the circle 24 represents the main auxiliary fuel tank. These three circles will be cutouts on the control panel occupied by gauges indicating the quantity of fuel contained in each of the tanks. Numerals 25, 26 and 27 represent boost pumps for delivering fuel from the three tanks respectively, and these boost pumps will be represented on the panel by corresponding toggle switches that control energization of the respective pumps. A check valve 30 is placed in the fuel line on the discharge side of each of these three pumps. Numeral 32 indicates a slot in the panel to represent a lever-controlled valve, the slot being occupied by the control lever of the valve, which lever is manipulated to route fuel to the left hand engine. A second slot 34 serves the same purpose for the right hand engine.

Normally fuel from the number one main fuel tank represented by the circle 20 is delivered by the boost pump 25 through a check valve 30 and through the lever-controlled valve 32 to the left hand engine, and in like manner fuel from the number two main fuel tank represented by the circle 22 is delivered by the boost pump 27 through a check valve 30 and the lever-controlled valve 34 to the right hand engine. The left hand engine is represented by a circle 35 and the right hand engine is represented by a circle 36. These two circles are cutouts in the control panel that are occupied by corresponding pressure gauges. The normal fuel flow to the two engines, then, is shown in Figure 1 by the following solid lines: a solid line 38 from the circle 20 to the slot 32, a solid line 40 from the slot 32 to the circle 35, a solid line 42 from the circle 22 to the slot 34, and a solid line 44 from the slot 34 to the circle 36.

Whenever desired, the boost pump 26 may be energized and the lever-controlled valve 32 may be adjusted for delivering fuel from the main auxiliary fuel tank 24 to the left hand engine represented by the circle 35, or the lever-controlled valve 34 may be adjusted to route the auxiliary fuel to the right hand engine 36. The piping of the fuel system also permits fuel from the main auxiliary fuel tank 24 to be delivered to either the number one main fuel tank 20 or the number two main fuel tank 22. The auxiliary fuel lines that are involved are indicated by broken lines on the diagram in Figure 1. These lines include: a broken line 45 from the circle 24 through a check valve 30, a broken line 46 from the downstream side of the check valve to the two slots 32 and 34, a broken line 48 connected to the broken line 46 for delivering auxiliary fuel through a check valve 49 to the number one main fuel tank 20 and a broken line 50 connected to the broken line 46 for delivering auxiliary fuel through a check valve 51 to the number two main fuel tank.

The piping system also provides for cross feed whereby the number one main fuel tank may supply fuel to the right hand engine and the number two main fuel tank may supply fuel to the left hand engine. For this purpose a slot 52 in the panel represents a left lever-controlled cross feed valve and is occupied by the lever of the valve and, in like manner, a slot 54 in the panel represents a right lever-controlled cross feed valve and is occupied by the lever of the valve. The cross feed piping is represented by lines formed by small crosses on the diagram and comprises the following lines: a line of crosses 55 from the solid line 40 to slot 52, a line of crosses 56 from slot 52 to slot 54, a line of crosses 58 from slot 54 to the solid line 44, a line of crosses 60 from line 56 through a check valve 62 and a cutoff valve 64 to the number one main fuel tank, and a line of crosses 65 from line 56 through a check valve 66 and a cutoff valve 68 to the number two main fuel tank.

The first step in the production of a panel incorporating the diagram of Figure 1 is to make a layout of the diagram with components of the diagram shown in black on a white background. In accord with the invention relatively narrow lines such as lines for lettering are shown in solid black on the layout, but the wider lines representing piping of the fuel system are shown in halftone.

Figure 2:
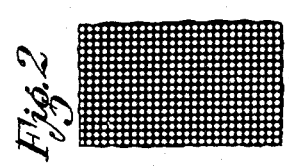
Figure 2 shows the pattern of a halftone sheet that may be used to lay out the diagram of such a fuel system for the purpose of reproducing the design on a panel.

In the preferred practice of the invention, commercially available transparencies known to the trade as "Zipatone" and "Art Type" are used having patterns thereon of various designs of halftone character. The preferred halftone pattern comprises black dots on a white background, the black dots occupying forty percent of the area. If desired a negative transparency of such a halftone pattern may be used having white dots on a black background. Figure 2 shows a portion of such a negative transparency slightly enlarged. The wide lines of the layout shown in Figure 3, however, are made of the positive transparency in which the black dots amount to forty percent of the halftone area. Instead of a halftone transparency opaque paper may be used with a halftone pattern printed thereon.

Since the diagram on Figure 1 employs three distinctive kinds of lines to represent different parts of the fuel system for the convenience of the operator, the halftone is employed in a manner to show three distinctive kinds of lines on the layout. Thus the layout in Figure 3 has continuous wide halftone lines 38 and 40 corresponding to the solid lines 38 and 40 on the diagram in Figure 1. In this instance the halftone material which is provided with a pressure-sensitive adhesive coating is mounted on the white layout paper in a band or strip to represent a pipeline, black ink marginal lines 70 having been previously placed on the layout paper.

Figure 3:
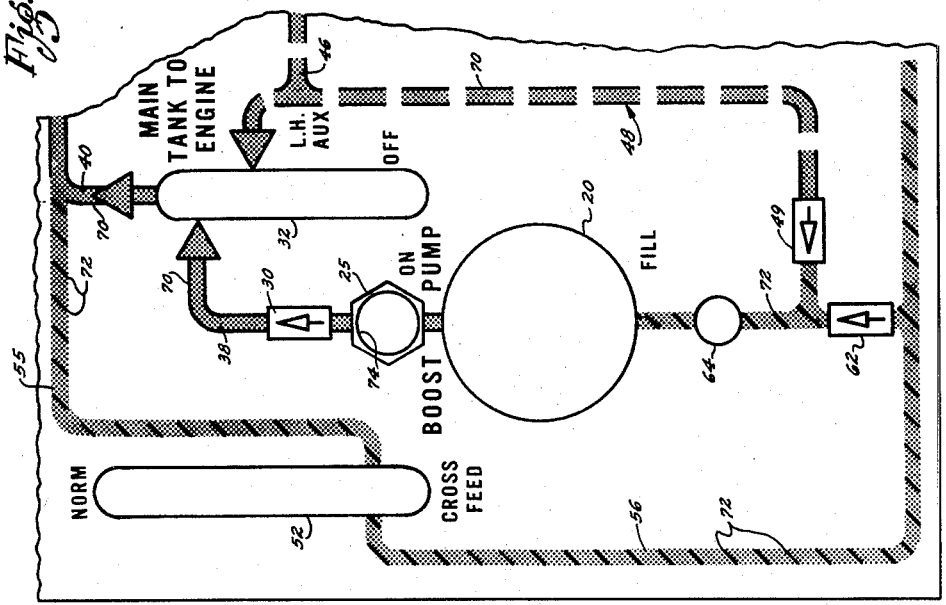
Figure 3 shows a fragment of the layout design which is reproduced as a positive transparency.

The line 48 for auxiliary fuel flow is made in the same manner with black marginal lines 70, but is provided with gaps as shown for distinction over the lines 38 and 40. The lines 55 and 56 representing the cross feed piping are formed on the layout by first drawing spaced diagonal lines 72 on the layout paper in black ink and then applying strips of the halftone material. Lines for cutouts representing the fuel tanks and for cutouts to form the various slots are made in black ink on the layout paper. Thus Figure 3 includes a black ink line forming a circle 20 and black ink lines 32 and 50 representing the corresponding slots. These circles and slots will be cut out in the finished panel. The cutoff valve 64 is represented by a small circle in black ink where the panel is to be cut out to permit the mounting of a valve-controlling knob on the panel. Each boost pump such as the boost pump 25 in Figure 3 is represented by a black ink line forming a hexagonal pattern which corresponds to the usual hexagonal nut by means of which a corresponding toggle switch is mounted on the panel. A black ink circle 74 inside the hexagonal pattern indicates how the panel is to be cut or bored to permit the toggle switch to be mounted in the panel. The various check valves such as the check valves 49 and 62 in Figure 3 are represented by black ink by rectangles enclosing arrows to indicate the direction of flow. Finally, lettering is added as indicated in Figure 3 and this step may be quickly and conveniently accomplished by pasting printed letters onto the white layout sheet.

Each of the black dots of the halftone areas of the layout shown in Figure 3 may be .020 to .025 inch in diameter and the lines forming the letters and all other lines including the marginal lines 70, the diagonal lines 72 and the rectangles representing the check valves may also be approximately .020 to .025 inch wide.

Figure 5:
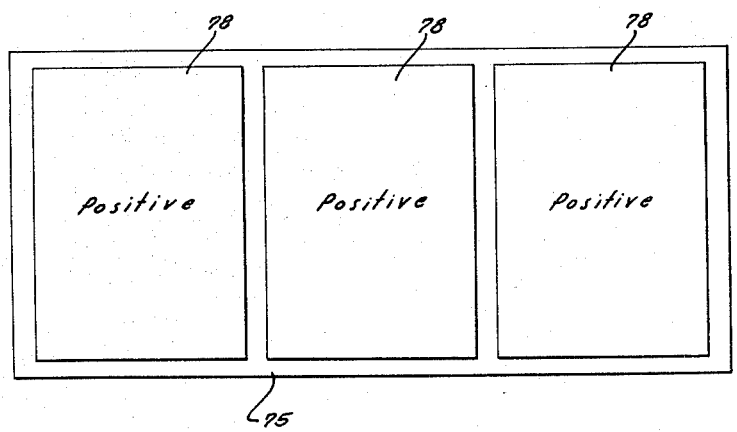
Figure 5 is a plan view showing how a plurality of positive transparencies may be used for the production of a multiple-panel die.
Figure 4:
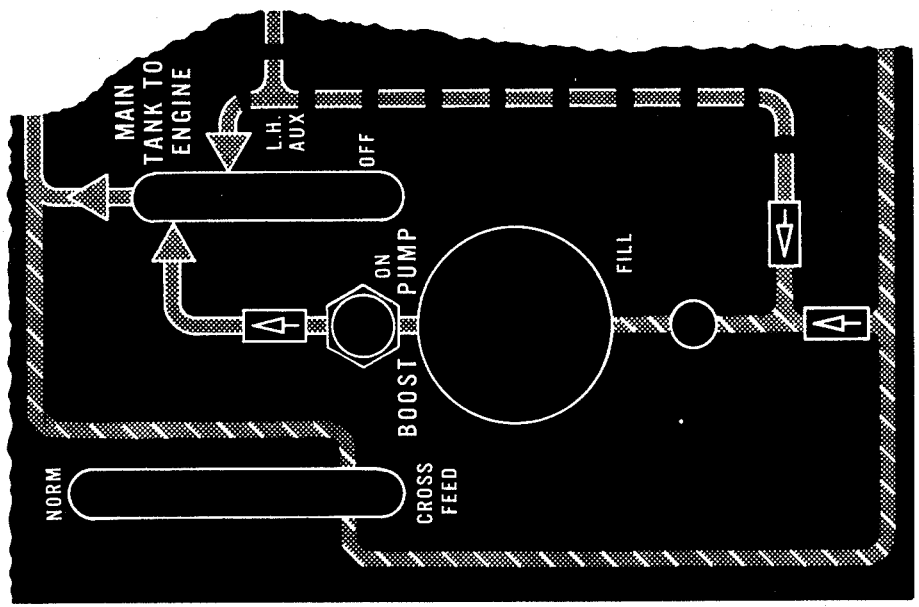
Figure 4 is the same portion of the design as reproduced on the finished panel.

The next step is to form a die from the layout of Figure 3 by a photographic technique. For this purpose a zinc plate, for example, may be coated with a light-sensitive emulsion. Thus Figure 6 shows on an enlarged scale a fragment of a zinc plate 75 coated with a light-sensitive emulsion 76. To carry out the process, a positive transparency is made of the layout shown in Figure 3, the positive transparency, of course, having the same appearance as the layout. It is to be noted that the terms positive and negative are relative. A positive transparency of Figure 3 is a negative relative to the ultimate panel since the ultimate panel has a black background as shown in Figure 4. To produce a three panel die, three positive transparencies 78 may be placed on an emulsion-coated metal plate 75 as shown in Figure 5.

Exposure of the emulsion 76 to light through a positive transparency 78 causes the emulsion to be hardened, the portions of the emulsion that are masked from the light remaining soft and water soluble. The next step is to wash away the soft portions of the emulsion to leave on the metal plate 75 an emulsion pattern in which the gaps or removed portions of the emulsion correspond to the black lines and dots of the white paper layout. The emulsion-coated metal plate 75 is then treated with acid to etch out the exposed portions. Thus in Figure 7 the recess 80 shown in cross-section corresponds to a marginal line 70 of a halftone area of the pipe line 38 and the recesses 82 represent dots of the halftone areas, the dot recesses in this instance being slightly narrower than the line recess.

To carry out the next step a laminated plastic plate is embossed by pressure against the etched plate 75 with the application of heat. The plastic plate may comprise a relatively thick layer of clear or transparent material and a thinner layer of suitable translucent plastic material. Thus in Figure 8 showing a plastic plate being embossed by the copper metal die, the plastic plate comprises a relatively thick transparent layer 84 and a thinner translucent layer 85. The layer 84 may be a plastic material such a methylmethacrylate which is commonly sold under the trade names "Plexiglas" and "Lucite." The translucent layer 85 may comprise a vinyl or polyvinyl resin such as polyvinyl chloride and preferably is non-plasticized polyvinyl chloride which is relatively hard to resist intrusion of the clear plastic 84 when presure is applied. The clear plastic layer 84 is relatively thick, being, for example, 3/16 inch thick, but the translucent layer 85 is relatively thin. In a successful practice of the invention the etched recesses 80 and 82 are .008 inch deep and the translucent layer 85 is .010 inch thick.

As a result of the application of heat and pressure in the embossing step, the plastic layers 84 and 85 of the panel plate are formed to a configuration such as indicated in Figure 8. The plastic plate is permitted to cool then removed from the die with a consequent slight shrinkage. The next step is to apply a layer of opaque material to the surface of the embossed translucent layer. For this purpose a black or gray epoxy resin incorporating a suitable catalyst may be sprayed onto the embossed plate to form an outer opaque layer 86 as indicated in Figure 9. The layer may be .003 inch thick, for example. The applied epoxy layer is then cured with the application of heat.

The final step is to shave away the embossed side of the epoxy-coated laminated plate to expose portions of the translucent layer 85 in accord with the desired pattern corresponding to the original layout in Figure 3. Figure 10 shows the result of shaving back the embossed side of the plate to the plane of the outer surface of the areas of the epoxy-coating 86 in the flat or unembossed portions of the laminated plastic. It will be noted in Figure 10 that a portion 88 of the translucent layer 85 is exposed to represent a marginal line 70 of Figure 3 and other portions 90 are exposed to represent the dots of the halftone area.

It is apparent that a multiple-panel die may be used to emboss a single relatively large laminated plastic plate to reproduce multiple duplications of the designs, the relatively large plastic plate being subsequently cut up to form a plurality of the finished panels. Each of the finished panels will have the appearance indicated by Figure 4 in which the black epoxy coating covers the major portion of the area of the panel with the intermediate translucent layer 85 exposed to show the lines and dots of the design pattern.

In an illuminated atmosphere the exposed portions of the translucent plastic layer 85 are clearly visible by reflected light and especially so because of the contrasting black background provided by the epoxy layer 86. On the other hand in a darkened environment the same pattern formed by the same lines and dots is visible by trans-illumination. Since white illuminated dots are so small and are spaced to occupy only forty percent of the halftone area, the flux density of the illumination is on the order of one to four foot lamberts. Thus the design on the panel is equally visible by reflected light and by transmitted light and yet the intensity of illumination by transmitted light is at the low level required for such a panel in a darkened aircraft cabin.

Figure 11 shows how the design pattern may be placed in relief by shaving away the material to a lesser depth than in Figure 10. In this instance, the material is shaved away to a plane spaced slightly forward from the plane of the outer face of the epoxy layer 86 of the embossed portions of the die. Thus in Figure 11 the exposed portions of the translucent layer 85 protrude slightly with the shoulders of the protruding portions covered by corresponding flanking portions of the epoxy resin layer 86.

My description in specific detail of a selected practice of the invention will suggest various changes, substitutions and other departures from my disclosure within the spirit and scope of the appended claims.

I claim:

1. In the construction of a panel having a design formed by translucent material masked by opaque background material, which design includes relatively wide lines for observation both by reflected light in an illuminated environment and by light transmitted through the material of the panel in a darkened environment, the improvement which consists in representation of the relatively wide lines by minutely spaced minute openings in the opaque background material exposing correspondingly minute areas of the translucent material with the width of a relatively wide line including several of the minute areas with a consequent halftone effect, whereby the relatively wide lines appear in full width by both reflected light and transmitted light but the transmitted light is masked over a substantial portion of the area of a relatively wide line to prevent undue illumination of the relatively wide line in a darkened environment.

2. A panel for illumination having a design thereon for observation either by reflected light or by light transmitted through the material of the panel, comprising: a unitary laminated plate of plastic material having an inner relatively thick layer of relatively clear light-transmitting material, an intermediate layer of translucent material and an outer layer of opaque material, said outer opaque layer having numerous minute openings exposing corresponding minute areas of said translucent material representing lines of said design with the width of each line including a plurality of said minute areas.

3. A panel as set forth in claim 2 in which the outer surfaces of the portions of said translucent layer that span said openings are substantially flush with the outer surface of said opaque layer.

4. A panel as set forth in claim 2 having embossed areas corresponding to and larger than said gaps with the gaps centered in the embossed areas and with said opaque layer extending over the margins of the embossed areas.

5. A panel having a design thereon for observation either by reflected light or by light transmitted through the material of the panel, comprising: an inner layer of light-transmitting material for trans-illumination of the panel; an intermediate layer of translucent material; and an outer opaque layer of a color contrasting with the color of the translucent material, said outer layer having numerous narrow gaps therein representing relatively narrow lines of said design and having groups of minute gaps therein representing relatively wide lines of the design with a halftone effect.

6. A panel as set forth in claim 5 in which some of said relatively wide lines of the pattern are distinguished from other lines of the pattern by a distinctive halftone pattern.

References Cited in the file of this patent

UNITED STATES PATENTS

| | | |
|---|---|---|
| 1,412,131 | Opel | Apr. 11, 1922 |
| 1,463,722 | O'Boyle | July 31, 1923 |
| 1,614,924 | Hutchison | Jan. 18, 1927 |
| 1,945,718 | Zinser | Feb. 6, 1934 |
| 2,206,290 | Meyer | July 2, 1940 |
| 2,230,009 | Ordorica | Jan. 28, 1941 |
| 2,324,694 | Gustkey | July 20, 1943 |
| 2,555,505 | Plumbo | June 5, 1951 |
| 2,594,081 | Shlenker | Apr. 22, 1952 |
| 2,602,036 | Sullivan | July 1, 1952 |